(12) United States Patent  (10) Patent No.: US 9,016,496 B2
Da Silva et al.  (45) Date of Patent: Apr. 28, 2015

(54) SUBSURFACE SYSTEM FOR THE COLLECTION OF REFUSE

(75) Inventors: Nuno Filipe Cardoso Cabral Martins Da Silva, Entroncamento (PT); Fernando Manuel Martins Fernandes, Entroncamento (PT); Gerard Georges Raphael Amanrich, Lasarte-Oria (ES)

(73) Assignee: MBE Sotkon SL,-Contenedores Subterraneos Para R.S.U., Lasarte-Oria (Gipuzkoa) (ES)

( * ) Notice: Subject to any disclaimer, the term of this patent is extended or adjusted under 35 U.S.C. 154(b) by 1023 days.

(21) Appl. No.: 13/123,314

(22) PCT Filed: Oct. 8, 2008

(86) PCT No.: PCT/PT2008/000038
§ 371 (c)(1),
(2), (4) Date: May 23, 2011

(87) PCT Pub. No.: WO2010/041969
PCT Pub. Date: Apr. 15, 2010

(65) Prior Publication Data
US 2011/0210124 A1  Sep. 1, 2011

(51) Int. Cl.
*B65F 1/14* (2006.01)
*B65F 1/16* (2006.01)
*B65F 3/02* (2006.01)

(52) U.S. Cl.
CPC ............ *B65F 1/1447* (2013.01); *B65F 3/0203* (2013.01); *B65F 2210/108* (2013.01); *B65F 2210/128* (2013.01); *B65F 2210/144* (2013.01); *B65F 2210/172* (2013.01); *B65F 2210/184* (2013.01)

(58) Field of Classification Search
USPC .......... 220/23.87, 23.9, 23.91, 262, 315, 484, 220/567.1; 340/603, 617, 620, 624; 405/129.45, 129.5, 129.55; 49/33; 52/169.6; 588/259, 260
See application file for complete search history.

(56) References Cited

U.S. PATENT DOCUMENTS

| | | | |
|---|---|---|---|
| 4,946,068 A * | 8/1990 | Erickson et al. ................. 222/23 |
| 5,719,556 A * | 2/1998 | Albin et al. .................... 340/618 |
| 6,539,678 B1 * | 4/2003 | Campbell et al. ............ 52/169.7 |
| 6,709,219 B2 * | 3/2004 | Reed, III ....................... 414/400 |

(Continued)

FOREIGN PATENT DOCUMENTS

| | | | |
|---|---|---|---|
| DE | 19638749 C2 * | 2/2002 |
| DE | 10056263 A1 * | 5/2002 |

(Continued)

OTHER PUBLICATIONS

International Search Report for International Patent Application No. PCT/PT2008/000038 dated Jul. 3, 2009.

*Primary Examiner* — Gregory Adams
(74) *Attorney, Agent, or Firm* — Pearl Cohen Zedek Latzer Baratz LLP

(57) ABSTRACT

The present invention relates to a subsurface refuse collection system comprising an underground bunker (4), a refuse container (3), a deposit bin (1) and a cover (2) with automatic opening and closing which can be powered electrically using a solar system. The container (3) is collected by means of an automated crane (18) with automatic hitching to facilitate collection. The system is equipped with multiple devices to measure volume and weight of the refuse deposited in the deposit bin (1), for the purpose of system monitoring or improvements to the management of truck routes. It also includes a safety device to prevent accidental fails into the underground bunker during collection.

12 Claims, 9 Drawing Sheets

(56) References Cited

U.S. PATENT DOCUMENTS

2007/0188307 A1 * 8/2007 Lai et al. .................. 340/286.06
2008/0203097 A1   8/2008 Da Silva et al.

FOREIGN PATENT DOCUMENTS

| DE | 10 2005 062795 |   | 7/2006 |
|----|----------------|---|--------|
| EP | 915035 A1      | * | 5/1999 |
| EP | 1293451 A1     | * | 3/2003 |
| EP | 1440918 A1     | * | 7/2004 |
| EP | 1 508 535      |   | 2/2005 |
| EP | 1508536 A1     | * | 2/2005 |
| FR | 2 461 664      |   | 2/1981 |
| NL | 1 032 120      |   | 1/2008 |

* cited by examiner

SUBSURFACE SYSTEM FOR THE COLLECTION OF REFUSE

CROSS-REFERENCE TO RELATED APPLICATIONS

This application is a National Phase Application of PCT International Patent Application No. PCT/PT2008/000038, International Filing Date Oct. 8, 2008, which is hereby incorporated by reference.

SUMMARY OF THE INVENTION

The present invention describes a subsurface refuse collection system. Comprises an underground bunker, a refuse container, a deposit bin and a cover with automatic opening and closing which can be powered electrically using a solar system. The container is collected by means of an automated crane with automatic hitching to facilitate collection. The system is equipped with multiple devices to measure volume and weight of the refuse deposited in the deposit bin, for the purpose of system monitoring or improvements to the management of truck routes. It also includes a safety device to prevent accidental falls into the underground bunker during collection.

PRIOR ART

Current subsurface refuse collection systems employ containers which are placed within an underground bunker located under a cover to which the deposit bin is coupled. The cover may be opened manually or automatically. Containers are collected using the crane on the collection truck. When the container is positioned above or next to the collection vehicle, it is opened from below or turned in order to unload the refuse into the vehicle. Hitching of the hook on the truck's crane to the bar on the container is performed manually.

Portuguese patents 101968, 102148, 102748 and Spanish patents 2036916, 2138480, 2153733, 2228225, 2228226, all issued to MBE SOTKON S.A., exemplify the features of prior art.

Portuguese patent 101968 and Spanish patent 2138480 refer to urban refuse deposits incorporating a number of independent compartments suitable for depositing refuse of the same or different types, for each of which there is at least one input bin or chute located on the corresponding hinged cover, positioned at a suitable height for refuse to be deposited inside it. Each of the compartments comprises, in its hinged cover, at least one unloading trapdoor into which an emptying chute can be inserted which, by means of vacuum or any other similar effect, empties the refuse into the collection vehicle.

Portuguese patent 102148 and Spanish patent 2153733 refer to a subsurface refuse system comprising one or more independent compartments for depositing of refuse of the same or different types, for each of which there is at least one input bin or chute located on a hinged cover, each compartment comprising at least one refuse container resting on a platform fitted with suitable means for lifting/lowering the unit between two positions, one underground, concealed by the hinged cover and the other for collection, in which refuse is transferred to the collection vehicles using the vehicle's emptying method, with or without tipping. Said container is equipped with a tray at the bottom fitted with its own means of opening and closing for resulting emptying of refuse without tipping. A different execution model includes a container with a fixed base fitted with its own means of manipulation by a collection vehicle and resulting emptying of refuse by tipping.

Portuguese patent 102748 and Spanish patents 2228225 and 2228226 refer to a system for opening the cover of underground deposits for solid urban refuse with a hinged cover. The cover comprises one or more hinges which allow it to swing open to an angle of around 90°; one or more locks locking the cover into the closed position; one or more fluid-operated, gas-operated or electric cylinders connecting the cover to the deposit to facilitate opening. The container, consisting of a single body, open on the upper side for use in systems for emptying by turning, equipped with a pair of diametrically opposed latches on the sides, or a double body for use in systems for emptying from below, said container also possessing a double cover with a perforated or multi-perforated tray at the top for drainage or liquids from the refuse towards a closed base.

There are in all such systems problems to be resolved: Performing automatic hitching of the truck's crane to the bar on the container, performing collection with a single operator, employing alternative energy sources to open the cover, monitoring the entire deposit/collection system and increasing safety during collection.

BRIEF DESCRIPTION OF THE FIGURES

The following description provided to better describe the present invention is based on the attached drawings that without limiting nature represent.

DETAILED DESCRIPTION OF THE INVENTION

Figure 12:
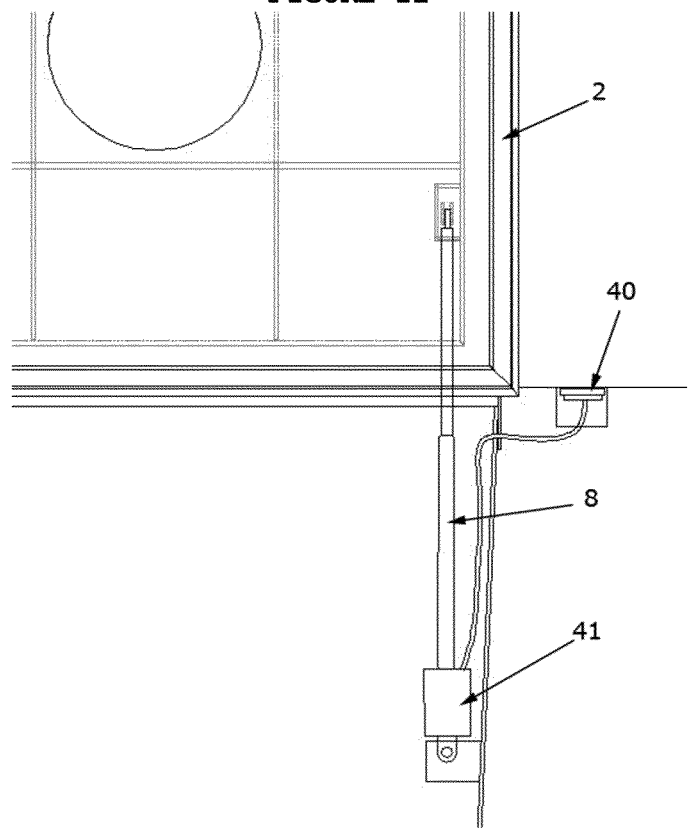
FIG. 12: Detail of the decompression chamber attached to the gas cylinder connected to a button located on the surface.

Is one object of the invention a system equipped with a cover (2), which has two hinges (5) on one side and a central lock (6) on the other with a safety bolt (7) placed vertically that prevents the rotation of the central lock (6) tab and consequently keeps the cover (2) closed. This cover (2) may be opened or closed automatically by means of gas cylinders (8) with a decompression chamber (41) that connected to a button (40) on a box on the surface enables the automatic closure of the cover by means of decompression of the gas from the cylinders into the chamber (41); or by electro-hydraulic cylinders (8); or a mixed system comprising one electro-hydraulic cylinder and one gas cylinder. The gas cylinders (8) attached to the underground bunker (4) and to the lid (2) have a driving action system electrically feed and once the safety bolt (7) is withdrawn and the lock is turned around (6) they allow the automated opening of the lid up to 90 degrees and also the automated closing by means of the mentioned button (40) that should be pressed in a continuous way (as it is represented in FIG. 12). The cylinders (8) may be powered by a solar system comprising one or more photovoltaic panels (10)(As it is represented in picture 3, where the Panel is located on a post next to the cover (2) and the deposit bin (1)), or by mains electricity, or electricity provided by the truck or an external generator.

Figure 1:
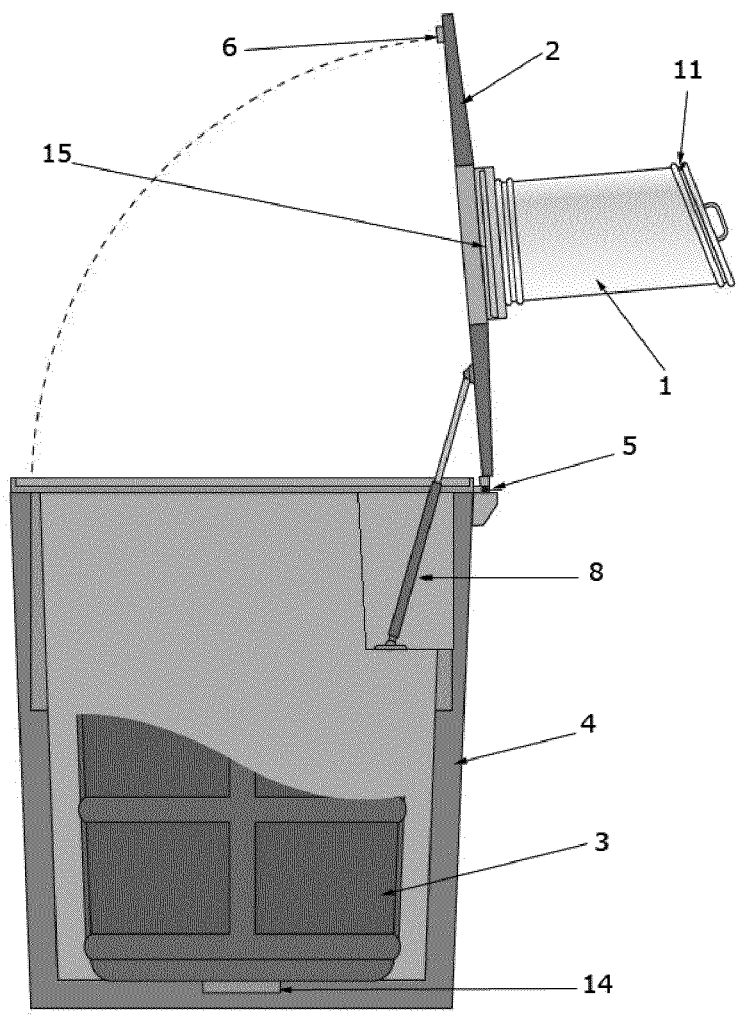
FIG. 1: Schematic side view of the subsurface system in the open position.

In FIG. 1 it is represented the subsurface system in the open position, comprising a deposit bin (1) located at a height of approximately 90 cm, a cover (2) which opens up to 90 degrees supporting the paving, a container (3) for collection of refuse and an underground bunker (4). The cover is fitted with two hinges (5) on one side and a central lock (6) on the other. The cover is opened by means of cylinders (8) fastened to the cover and the underground bunker. The deposit bin (1), which has an upper cover, may include a central lock (11) which keeps it closed. For weighing of the refuse deposited in the container (3) or refuse deposited in the deposit bin (1) there may be load cells (14) in the underground bunker or load cells (15) at the bottom of the deposit bin, as described ahead.

Figure 2:
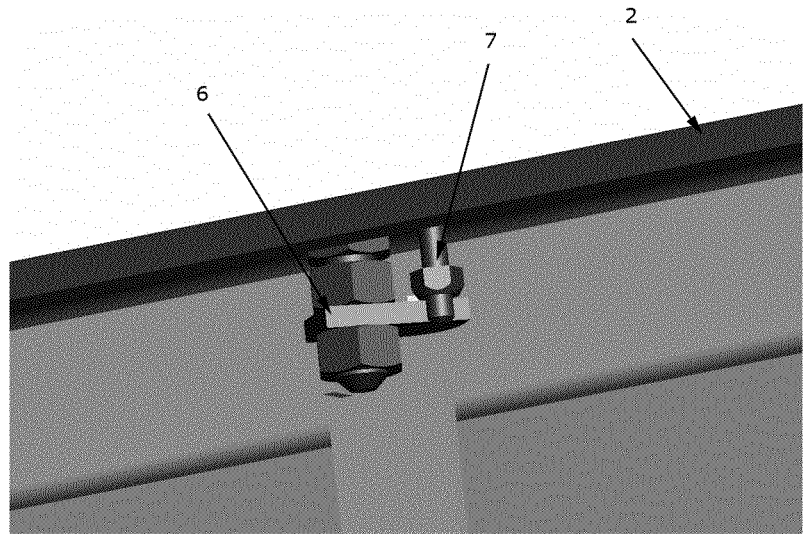
FIG. 2: Detail of the central lock.
Figure 3:
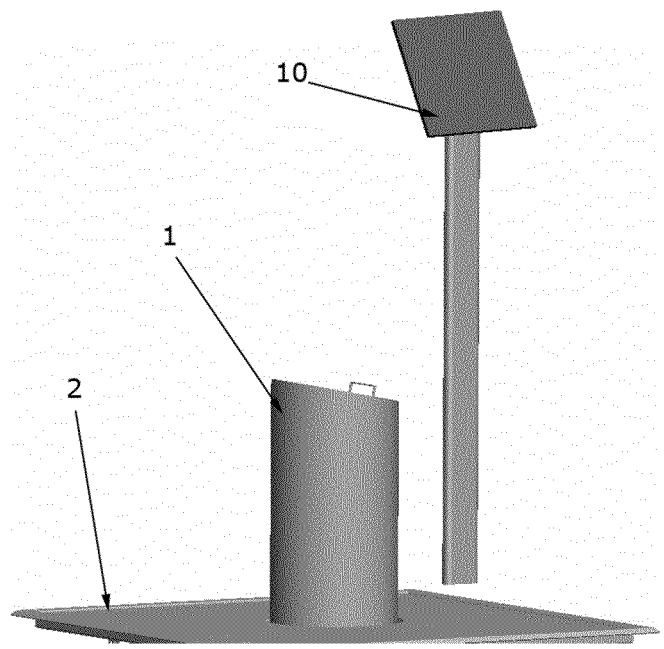
FIG. 3: Diagram of a solar system to power the cylinders.

At FIG. 2 is possible to see the detail of the central lock (6) with safety bolt (7) keeping the cover (2) closed.

The movements of the cover (2) are controlled remotely by a mobile device or by a system of buttons as mentioned previously accessible only to the operator located on the street next to the cover (2), or by the positioning of a mobile device near a radio frequency identification post (9), located on the street next to the cover.

After opening the cover (2), the container (3) is emptied by means of an automatic hitching system between the container (3) and the automatic crane (18) of the collection truck (17).

The container for collection by opening from below is completely open on the upper side, and each side is equipped with a set of arms (22), the upper extremity of which connects to the system located at the top of the crane, and at the lower end are joined to the base (19), which is articulated by means of hinges (20). The above set of arms (22) comprises a movable arm (25) located within a fixed arm (26) coupled to the body of the container (3). Both arms have at the upper end a number of grooves (27 and 27') to enable coupling.

Figure 6:
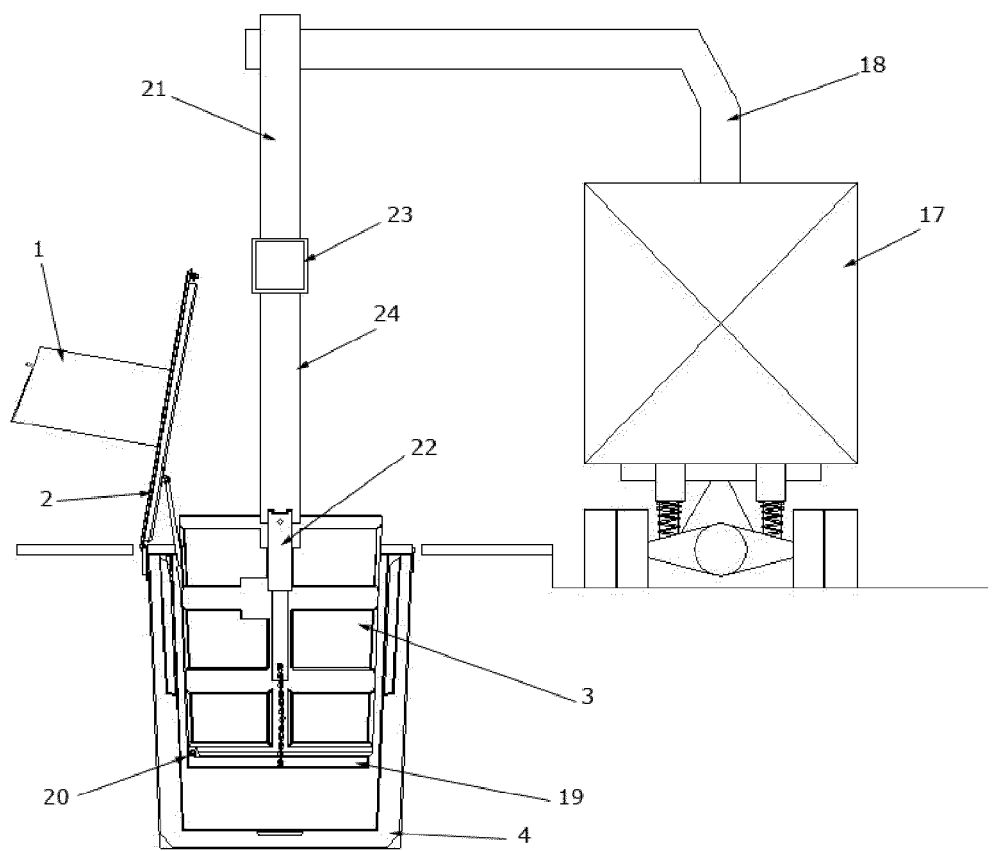
FIG. 6: Schematic section of the subsurface system in the open position with the container being lifted by the automatic crane of the collection truck.

The FIG. 6 shows the subsurface system in the open position with the container (3) being lifted by the automatic crane (18) of the collection truck (17). As it is possible to observe, the top of the automatic crane (18) is equipped with a coupling system (21) which hitches to a set of arms (22) on each side of the container (3). The set of arms (22) is connected to the base (19), articulated with hinges (20). This coupling system (21) connected to the arms of the crane is equipped with 1 horizontal arm (23) and two vertical arms (24).

The container with a closed base, for unloading by turning, possesses on the inside of each side a fixed arm (31) coupled to the body of the container (3), which at its extremity is equipped with a number of grooves (32) enabling coupling to the outer element (28) of the coupling system (21) located at the top of the crane.

Figure 7:
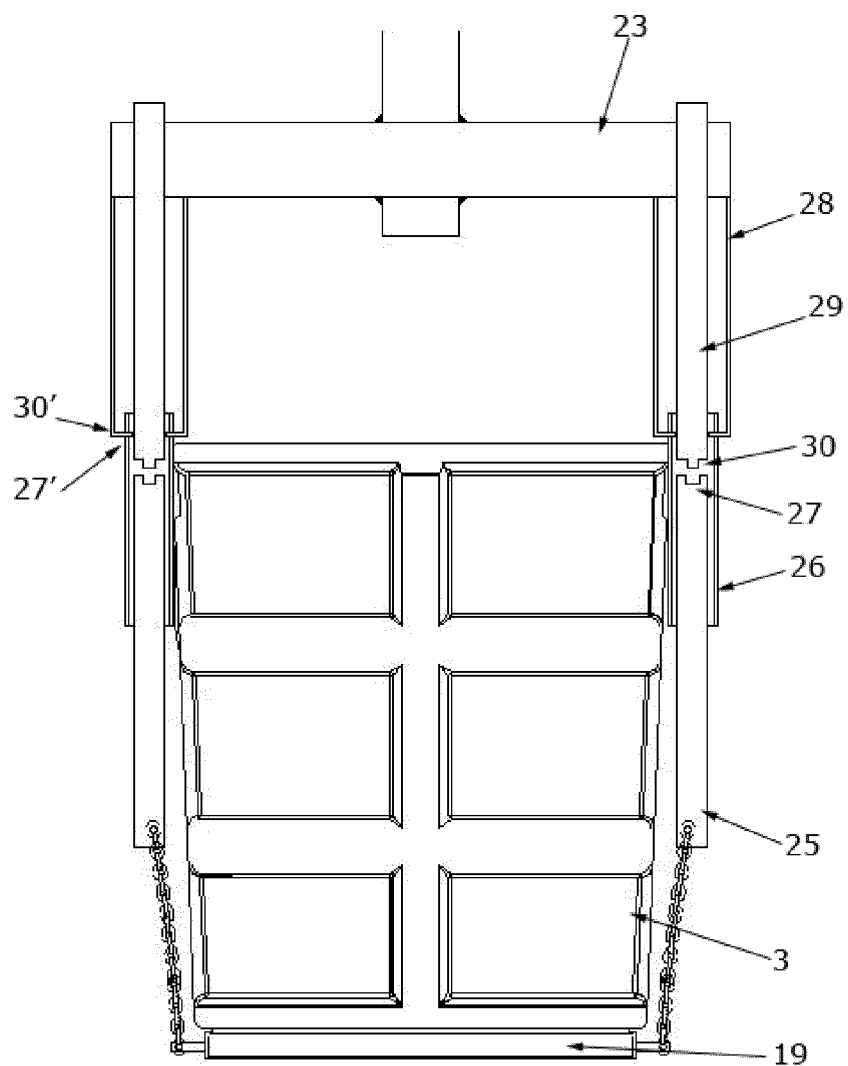
FIG. 7: Automatic hitching system between the automatic crane of the collection truck and the container emptied from below.

The top of the truck's collection crane is equipped with a coupling system (21) with 1 horizontal arm (23) which can rotate 360 degrees and two other vertical arms (24) which move vertically by means of fluid-operated cylinders. Each of the vertical arms (24) of the coupling system (21) comprises an outer element (28) and an inner element (29) which in turn both have at each extremity a grip (30 and 30') for coupling, as it is represented in FIG. 7.

For containers with a lid in the base, collection can be carried out as follows:
- Automatic opening of the cover (2) of the subsurface system.
- Movement of the crane (18) until the top is located above the underground container, controlled automatically by the operator.
- By means of a system using proximity sensors located on the crane (18) and the container (3), the inner element (29) is automatically hitched to the grooves (27) on the movable arms (25) of the container, and the outer element (28) to the grooves on the fixed arm (26) of the container.
- Based on memorisation of the above movements, the container (3) is automatically lifted using the crane (18) of the collection vehicle to the unloading point.
- The base of the container is opened by the operator by means of vertical movement of the inner element (29) of the vertical arms (24) of the coupling system (21), pushing the movable arm (25) on the container which supports the base.
- The base of the container is closed by the operator following emptying of the refuse by means of opposite vertical movement of the inner element (29) of the vertical arms (24) of the coupling system (21).
- Automatic movement of the container (3) from the unloading point into the underground bunker (4).
- Automatic disengagement of the inner element (29) from the grooves (27) on the movable arms (25) of the container, and of the outer element (28) from the grooves on the fixed arm (26) of the container.
- Movement of the crane (18) to the collection point, controlled automatically by the operator.
- Automatic closure of the cover (2) of the subsurface system.

Containers with a Closed Base can be Emptied as Follows:
- Automatic opening of the cover (2) of the subsurface system.
- Movement of the crane (18) until the top is located above the underground container, controlled automatically by the operator.
- By means of a system using proximity sensors located on the crane (18) and the container (3), the outer elements (28) of the coupling system (21) located at the top of the crane, are automatically hitched to the fixed arms (31) coupled to each side of the container
- Based on memorisation of the above movements, the container is automatically moved to the rear of the collection vehicle.
- Positioning of the container onto the rear lifting mechanism for emptying, controlled by the operator
- Automatic movement of the container (3) from the unloading point into the underground bunker (4).
- Automatic disengagement of the elements connecting the container (3) to the crane (18)
- Movement of the crane (18) to the collection point, controlled automatically by the operator.
- Automatic closure of the cover (2) of the subsurface system.

Figure 8:
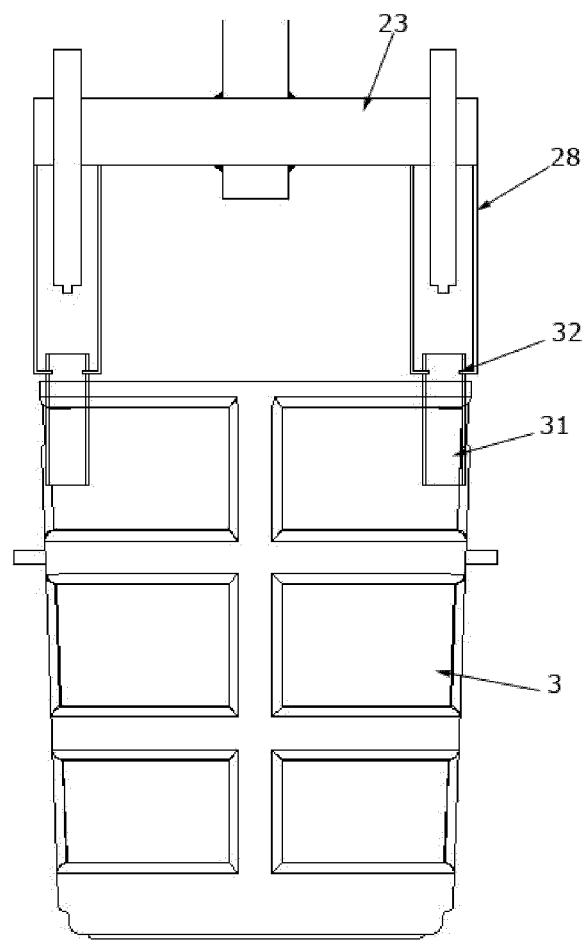
FIG. 8: Automatic hitching system between the automatic crane of the collection truck and the container with a closed base for emptying by turning.

The described automatic hitching system between the automatic crane (18) of the collection truck (17) and the container with a closed base for emptying by turning is represented in FIG. 8. The container is equipped on each side with a fixed arm (31) which at the upper extremity has a groove (32) enabling hitching to the outer element (28) of the coupling system (21).

When the container (3) is removed from inside the underground bunker (4), a safety device covers the entirety of the opening of the underground bunker (4) in order to avoid accidental falls during collection. The safety device remains concealed against one of the walls of the underground bunker (4) whenever the container (3) is located inside the underground bunker (4). When the container (3) is lifted for collection, the device swings into the horizontal position, covering the opening of the bunker(4).

Figure 9:
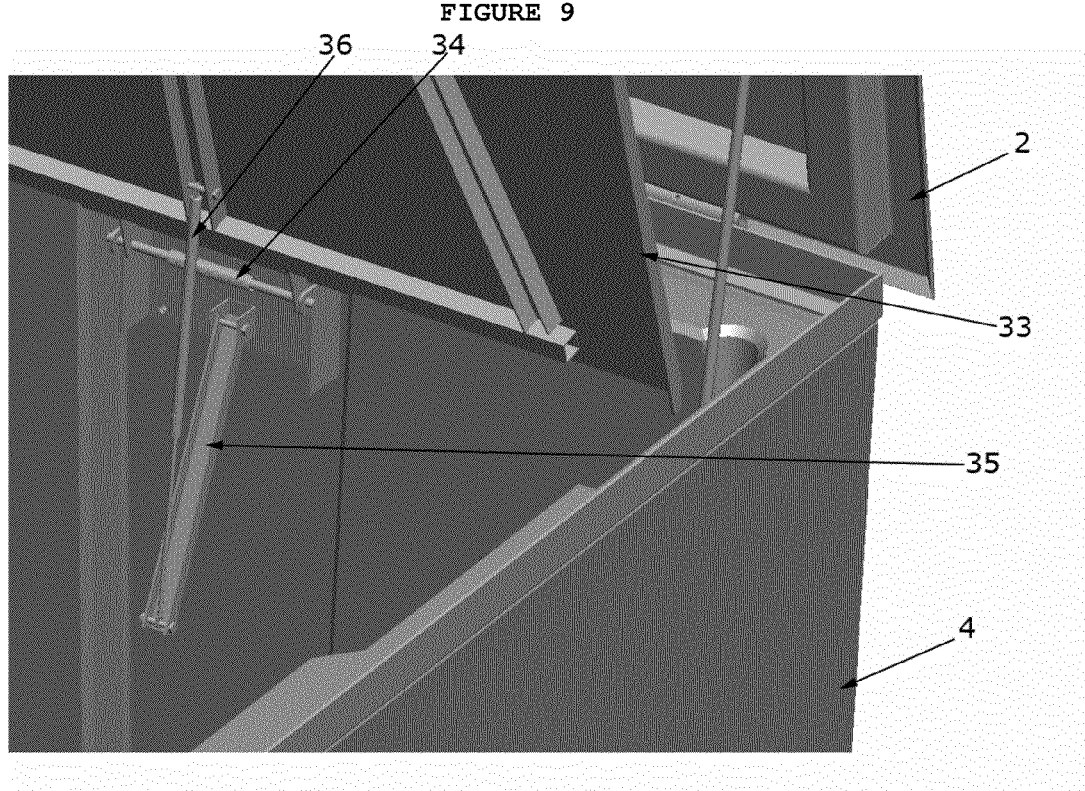
FIG. 9: Safety system in the outer vertical position.
Figure 10:
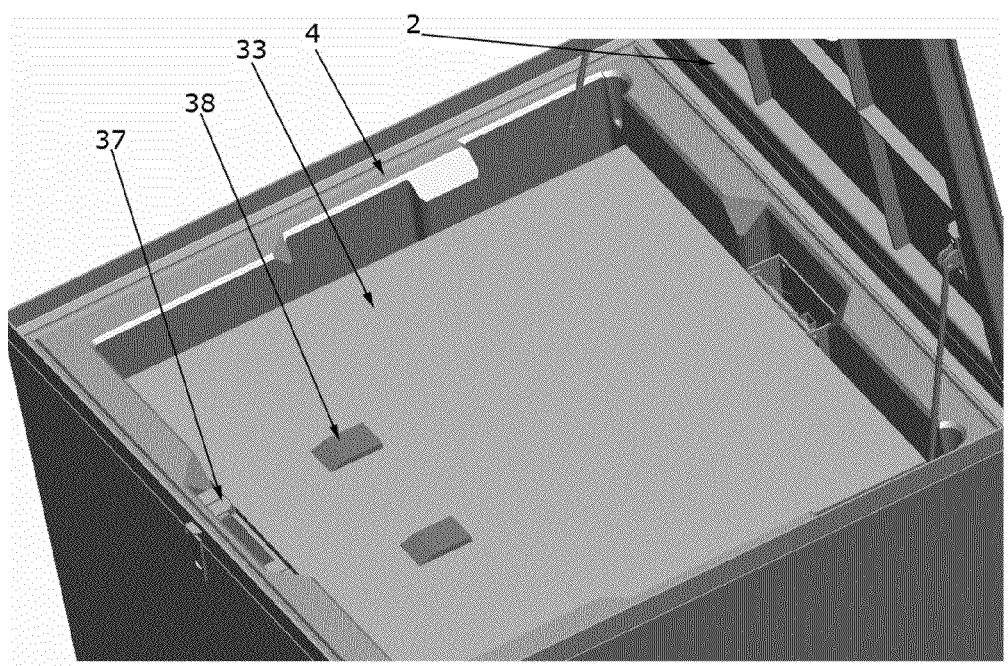
FIG. 10: Safety system in the horizontal position to cover the opening of the underground bunker when the container is collected.
Figure 11:
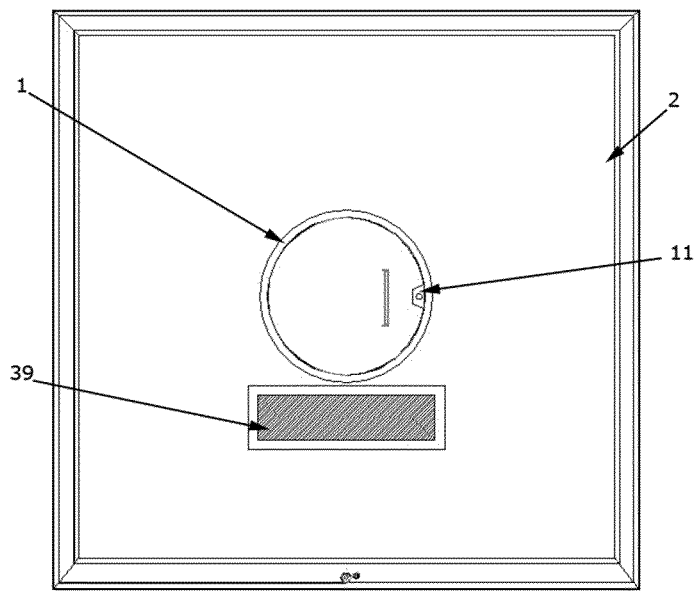
FIG. 11: System for detection of the weight of refuse deposited.

This safety device, connected to one wall of the underground bunker (4), is equipped with the following elements to allow automatic positioning and shock absorption: a rotating arm (35), a gas shock absorber (36) and a shock-absorbing spring (34). When the safety device is in the horizontal position during collection of the container (3), there are two locks (37) located on the front wall of the bunker (4) which keep the device secure and stable. When the container (3) is replaced inside the underground bunker (4), the locks (37) are released mechanically by means of two pedals (38) which are simultaneously depressed by the container (3), forcing the device to swing back into its initial position. As it is possible to observe in FIG. 9, the safety system in the outer vertical position comprises a movable element (33) connected to the rear wall of the underground bunker by means of a unit comprising a rotating arm (35), a gas shock absorber (36) and a shock absorbing spring (34). In FIG. 10 it is represented the safety system in the horizontal position to cover the opening of the underground bunker (4) when the container (3) is collected. The movable element (33) is connected to the front wall of the underground bunker (4) with two locks (37) which are released mechanically when two pedals (38) are depressed simultaneously.

It is also possible to move the device manually from the inner horizontal position to the outer vertical position for access to the underground bunker (4) for cleaning or maintenance.

Figure 4:
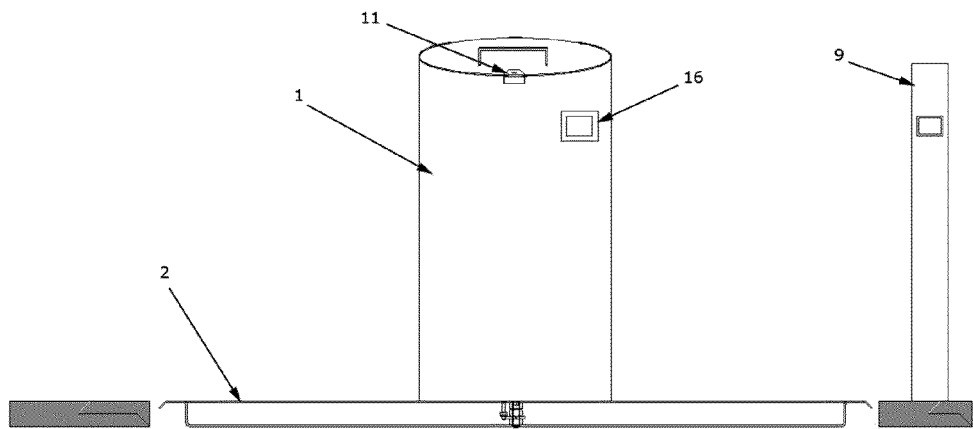
FIG. 4: Front view of the outside of the system.

The upper part of the deposit bin (1) can be kept closed by means of a lock (11). This enables it to be opened only by specified users. The lock is operated by positioning a mobile device close to a radio frequency identification system (16) located in the deposit bin (1) post, allowing opening of the upper hatch of the deposit bin. Such situation is visible in FIG. 4 where the deposit bin (1) is equipped with a radio frequency identification system (16) that enables the lock (11) opening of the deposit bin (1) by the positioning of a mobile device close to it. Outside the perimeter of the cover (2) of the system there is also a radio frequency identification post (9) which can control the movements of the cover by positioning a mobile device close to it.

The level of refuse in the container can be monitored by means of a mobile probe (12) or probes located in the cover (2) which supply the data to a microprocessor which calculates the level of refuse as a percentage and sends this information to a central module controlling the management of refuse collection, via a communication device. When the percentage of refuse reaches a preset value, the microprocessor can also send a message resulting in activation of a locking device (11) in the deposit bin (1) of the subsurface system.

Figure 5:
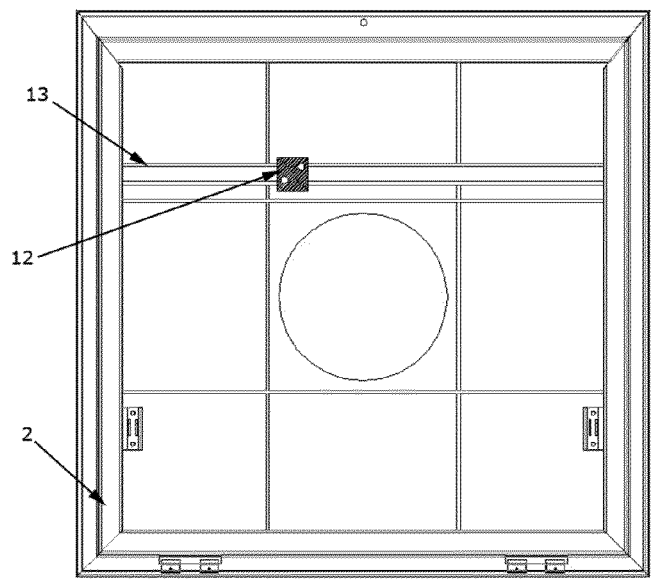
FIG. 5: Detail of a channel attached to the bottom of the cover of the system.

Is possible to observe in FIG. 5 a channel (13) attached to the bottom of the cover (2) of the system which enables the movement of a probe (12) to read various levels of volume in different parts of the subsurface container (3).

The weight of refuse held in the container can also be monitored by means of a load cell (14) fastened to the underground bunker (4) and placed under the container (3) allowing continuous weighing of the container (3) and refuse placed inside it. A microprocessor receives the information from multiple weighings of the container (3) according to a preset schedule, calculates the weight of refuse as a percentage, and sends it to a central module controlling the management of refuse collection, via a communication device.

The weighing of refuse placed in a subsurface refuse collection system, accessible only to specified users, can be carried out in one of two ways:
- A cell (15) located in the lower part of the bin (1) allowing continuous weighing of the opening and refuse placed within it.
- A load cell (39) enabling weighing of the user and the refuse to be deposited, placed on the cover (2) of the subsurface system next to the deposit bin (1), configured in such a way that the user must place both feet on it in order for the lock (11) at the top of the deposit bin to be opened, enabling refuse to be deposited.

Information received from the weighings of each deposit is processed by a microprocessor which calculates the weight of the refuse as a percentage, and sends it to a central module controlling the management of refuse collection via a communication device.

In picture 11 it is represented the system for detection of the weight of refuse deposited comprising a load cell (39) enabling weighing of the user and of the refuse to be deposited, located on the cover (2) of the subsurface system next to the deposit bin (1) which is fitted with a lock (11) on the upper hatch.

Measurement of the volume of refuse deposited in the bin, accessible only to specified users, can also be carried out by means of a set of probes located on the inner walls of the deposit bin which detect the approximate volume of the bag deposited.

As it is evident to experts in the area several changes are possible without going against the ambit of the following claims.

Lisbon, 8th Oct. 2008

The invention claimed is:

1. A subsurface system for collection of refuse comprising various independent modules according to the type of refuse to be collected, said system comprising:
in the subsurface area, an underground bunker and a container for collection of the refuse lifted by means of an automatic crane on a collection truck; and
on a surface, a post on a cover, said post having an input bin located at a height of 90 cm from said cover, which opens up to 90 degrees and supports the paving;
means to open and close the cover;
means to automatically hitch the automatic crane of the collection truck to the container;
safety devices comprising a moving element which remains stowed against the wall of the bunker when the container is inside the bunker and tips into a horizontal position when the container is collected, covering the bunker opening;
means to open and close the input bin;
means to measure a volume of refuse in the container;
means to measure a weight of a container; and
means to measure a weight of refuse deposited in the input bin;
wherein the means for automatically hitching of the crane to a container with a closed base and completely open on an upper side are such that the container has, on each inner side, a fixed arm coupled to the body of the container, which, at its upper extremity, has a groove configured to be hitched to an outer element of a coupling system at a top of the crane in such a way as to enable automatic lifting of the container to the point where it will be emptied by turning.

2. The subsurface system for collection of refuse according to claim 1, wherein the means to open and close the cover comprises two hinges on one side, a central lock on the other side and one or more gas cylinders connected to the underground bunker and the lid, and a safety bolt positioned vertically and attached to the cover preventing the tab of the central lock from turning in the presence of external vibrations, which would cause the cover to open in undesirable circumstances;
    wherein the cylinders are connected to a button on a box located at the surface enabling automatic closure of the cover by means of decompression of the gas from the cylinders into a chamber; and
    wherein the movements of the cover and the crane are remotely controlled using a remote control by means of continuous push buttons to control the movement.

3. The subsurface system for collection of refuse according to claim 1, wherein the means to open and close the cover comprise two hinges on one side, and two cylinders connected to the underground bunker and the lid, wherein said cylinders are electric or electro-hydraulic, and combinable with gas cylinders.

4. The subsurface system for collection of refuse according to claim 1, wherein the means for automatic hitching of the automatic crane of the collection truck to a container emptied from below, used for automatic lifting and transfer of the container to the emptying point by means of an automatic system of proximity sensors, are such that said container is completely open on the upper side and is equipped, on each side, with a single set of arms, which, at an upper extremity, are connected to a coupling system located at the top of the crane, and, at a lower extremity, are provided with chains configured to connect to a base of the body of the container, said base being articulated with a hinge;
    said set of arms comprising a movable arm located within a fixed arm coupled to the body of the container and both arms having at the top a groove for coupling;
    said coupling system connected to the arms of the crane having a horizontal arm configured to rotate 360 degrees and two other vertical arms that move vertically by means of fluid-operated cylinders;
    each of the two vertical arms of the coupling system comprising an outer element and an inner element which in turn both possess, at a lower extremity, a grip for coupling;
    wherein coupling is effected by means of hitching of the lower element to the grooves on the movable arms of the container and hitching of the outer element to the grooves of the fixed arm of the container, thus enabling rigid and automatic lifting of the container to the emptying point; by vertically moving the inner element of the vertical arms of the coupling system by means of fluid-operated cylinders, and by pushing or pulling of the movable arm on the container it is thus possible to open and close the base of the container in order to empty it of refuse.

5. The subsurface system for collection of refuse according to claim 1,
    wherein the safety devices include a movable element which remains stowed against the wall of the bunker when the container is inside the bunker and swings into horizontal position when the container is collected, covering the opening of the bunker;
    wherein the rear wall of the underground bunker and the movable element are connected by a unit comprising a rotating arm, a gas shock absorber and a shock absorbing spring to allow automatic swinging and shock absorption of the movable element from an inner vertical position to an inner horizontal position at the moment of collection and manual tipping from the inner horizontal position to the outer vertical position for access to the underground bunker for cleaning or maintenance; and
    wherein the front wall of the underground bunker and the movable element, when in horizontal position during collection of the container, are connected by two locks that are released mechanically when two pedals located on the movable element are depressed simultaneously by the container.

6. The subsurface system for collection of refuse according to claim 1, wherein the means to open and close the input bin, for use only by specified users, are equipped with a lock configured to lock the hatch of the input bin, allowing it to be opened only when activated and enabled electrically by positioning of a mobile radio frequency identification device near a radio frequency identification system located in the input bin post.

7. The subsurface system for collection of refuse according to claim 1, wherein the means to measure the volume of a container in a subsurface system for collection of refuse comprise:
    a mobile probe that detects the proximity of objects, positioned in a rail located in the cover which enables the probe to move in order to measure different volume levels in different parts of the inside of the subsurface container;
    a first microprocessor configured to receive information regarding the different levels of volume of the container, calculate the volume of refuse as a percentage and send the calculation to a central module controlling the management of refuse collection via a communication device; and
    a second microprocessor configured to receive the information regarding the various levels of volume of the container, calculate the volume of refuse as a percentage of the capacity of the container and, when the volume reaches a preset value, send a message resulting in activation of a locking device in the input bin of the subsurface system.

8. The subsurface system for collection of refuse according to claim 1, wherein the means to measure the volume of refuse in a container are equipped with one or more fixed probes fastened to the cover which enable various levels of volume in different parts of the inside of the subsurface container to be measured.

9. The subsurface system for collection of refuse according to claim 1, wherein the means to measure the weight of a container in a subsurface system for refuse collection include:
    a cell fastened to the underground bunker and located under the container enabling continuous weighing of the container and the refuse deposited therein; and
    a microprocessor configured to receive the information from multiple weighings of the container according to a preset schedule, calculates the weight of refuse as a percentage, and send the calculate to a central module controlling the management of refuse collection, via a communication device.

10. The subsurface system for collection of refuse according to claim 1, wherein the means to measure the weight of refuse deposited in the input bin comprise:

a cell located at the bottom of the input bin allowing continuous weighing of the input bin and the refuse placed therein; and a microprocessor configured to receive information from multiple weighings of the input bin when refuse is deposited, calculate the weight of refuse as a percentage, and send the calculation to a central module controlling the management of refuse collection, via a communication device.

11. The subsurface system for collection of refuse according to claim 1, wherein the means to measure the weight of refuse deposited comprise:

a load cell enabling weighing of the user and the refuse to be deposited, placed on the cover of the subsurface system next to the input bin, configured in such a way that the user must place both feet on the load cell in order for the lock at the top of the input bin to be opened, enabling refuse to be deposited; and a microprocessor configured to receive information regarding the weight measured by the cell before and after refuse is deposited, calculate the weight of refuse as a percentage, and send the calculation to a central module controlling the management of refuse collection, via a communication device.

12. The subsurface system for collection of refuse according to claim 1, wherein the means to measure the volume of refuse deposited in the input bin comprise a set of probes located on inner walls of the input bin which detect the approximate volume of the bag deposited.

\* \* \* \* \*